United States Patent [19]

Hemphill et al.

[11] Patent Number: 5,781,716
[45] Date of Patent: Jul. 14, 1998

[54] FAULT TOLERANT MULTIPLE NETWORK SERVERS

[75] Inventors: John M. Hemphill, Spring; Gregory Mart Stewart; Thomas S. Lawler, both of Houston, all of Tex.

[73] Assignee: Compaq Computer Corporation, Houston, Tex.

[21] Appl. No.: 802,644

[22] Filed: Feb. 19, 1997

Related U.S. Application Data

[63] Continuation of Ser. No. 491,738, Jun. 19, 1995, Pat. No. 5,696,895, which is a continuation-in-part of Ser. No. 445,283, May 19, 1995, Pat. No. 5,675,723.

[51] Int. Cl.$^6$ .................................................. G06F 11/34
[52] U.S. Cl. .............................. 395/182.02; 395/182.13
[58] Field of Search ......................... 395/180, 182.02, 395/181, 182.01, 182.03, 182.08, 182.09, 182.11, 182.21, 182.15, 183.13; 364/268, 269.9, 242.94, 228.3, 229, 229.4

[56] References Cited

U.S. PATENT DOCUMENTS

| | | | |
|---|---|---|---|
| 4,590,554 | 5/1986 | Glazer et al. | 395/182.11 |
| 4,710,926 | 12/1987 | Brown et al. | 395/182.02 |
| 5,155,729 | 10/1992 | Rysko et al. | 395/182.09 |
| 5,157,663 | 10/1992 | Major et al. | 395/183.08 |
| 5,271,013 | 12/1993 | Gleeson et al. | 395/182.08 |
| 5,390,326 | 2/1995 | Shah | 395/185.08 |
| 5,394,526 | 2/1995 | Crouse et al. | 395/200.42 |
| 5,423,026 | 6/1995 | Cook et al. | 395/182.08 |
| 5,423,037 | 6/1995 | Hvasshovd | 395/182.02 |
| 5,471,634 | 11/1995 | Giorgio et al. | 707/104 |
| 5,537,585 | 7/1996 | Blickenstaff et al. | |
| 5,546,452 | 8/1996 | Andrews et al. | 379/219 |
| 5,566,297 | 10/1996 | Devarakonda et al. | 395/182.13 |
| 5,592,611 | 1/1997 | Midgely et al. | 395/182.02 |
| 5,608,865 | 3/1997 | Midgely et al. | 395/180 |
| 5,633,999 | 5/1997 | Clowes et al. | 395/182.04 |

FOREIGN PATENT DOCUMENTS

| | | |
|---|---|---|
| 1516449 | 7/1978 | United Kingdom. |
| 2195192 | 3/1988 | United Kingdom. |

OTHER PUBLICATIONS

Vijayan, Jaikumar, "Vinca, Tricord offer low–cost fault tolerance," Computerworld (Mar. 13, 1995) p. 53 ©1995 IBM Corp.

Katz, William F., "Five fault–tolerant products follow varied routes to goal of data security," PC Week (Jun. 27, 1994) © 1994 Ziff–Davis Publishing Co.

"NSI 7000 detects and replaces failed servers," PC Week (Jan. 10, 1994) © 1994 Ziff–Davis Publishing Co.

Wilson, Jayne, "Third parties ofer LAN fault tolerance," InfoWorld (Dec. 13, 1993) © 1993 InfoWorld Publishing Co.

Smalley, Eric, "Alternative to SFT III permits coupling of dissimilar servers," PC Week (Nov. 8, 1993 © 1993 Ziff-–Davis Publishing Co.

Rigney, Steve, "NetGuard's alternative to SFT III," PC Magazine (Oct. 12, 1993) © 1993 Ziff-Davis Publishing Co.

Shimmin, Bradley F., "SFT Level III protection, but without the big price tag," LAN Times (Oct. 04, 1993) © 1993 McGraw-Hill, Inc.

(List continued on next page.)

*Primary Examiner*—Albert Decady
*Attorney, Agent, or Firm*—Pravel, Hewitt, Kimball & Krieger

[57] ABSTRACT

A fault tolerant multiple network server system in which multiple servers concurrently act as back-up servers for each other even while they are providing their own server services to the system. Rather than having an unused server monitoring for failure of a primary server and taking over control, each is act upon the network, but when its partner should fail, it assumes control of these partner servers storage subsystem. In this way, processing power of both servers is available during normal operation, but they each provide back-up capability for the other.

5 Claims, 7 Drawing Sheets

OTHER PUBLICATIONS

Shimmin, Bradley F., "NSI 7250 Fail-Safe Subsytem: Netguard Systems, Inc.," LAN Times (Oct. 04, 1993) © 1993 McGraw-Hill, Inc.

Francis, Bob, "Compaq Takes the High End," Infoworld ($-_{13}5$) © 1995 Infoworld Publ. Co.

HP 9000 Corporate Business Server. © 1995 Hewlett-Packard Co.

FAULT TOLERANT MULTIPLE NETWORK SERVERS

RELATED APPLICATIONS

This application is a continuation of U.S. application Ser. No. 08/491,738, filed Jun. 19, 1995, now U.S. Pat. No. 5,696,895, which is a continuation-in-part of application Ser. No. 08/445,283, filed May 19, 1995, now U.S. Pat. No. 5,675,723.

BACKGROUND OF THE INVENTION

1. Field of the Invention

The invention relates to fault tolerant configurations of network servers, and more particularly, to multiple active servers that provide simultaneous backup capability.

2. Description of the Related Art

From their humble beginnings as personal, desktop computers, microprocessor-based computing systems have made great strides in providing for the ever expanding computing needs of data processing systems. Networks of microprocessor-based computers have made tremendous inroads into what was once the exclusive domain of large mainframe computers. Powerful microprocessor-based computers can act as servers on networks of hundreds of personal computers. These networks have provided powerful distributed computing capability in conjunction with centralized access to data, along with direct communications between the personal computers on the network.

The expansion of the microprocessor-based computing system into the mainframe domain, however, has not been problem free. Mainframe systems have historically been designed to be reliable and extremely "fault tolerant," in that a failure of a portion of the mainframe system does not result in corrupted data or extensive downtime. Fault tolerance has long been the mainstay of the mainframe world, but with the inroads of microprocessor-based networks into that realm, network users are increasingly demanding that their networks provide fault tolerance even to the extent historically found in mainframe computers.

To this end, developers have introduced a number of schemes for providing fault tolerance in microcomputer networks. Typically, a network includes network hardware, work stations, and one or more servers, each with its own mass storage subsystem. The servers are a cornerstone of the entire system, providing data and communications among the various work stations. If one of these servers should fail, or its mass storage subsystem become corrupted, this can bring the entire network to a halt.

To improve the fault tolerance of such servers, vendors have supplied a number of fault tolerant systems. One such standard is "SFT III," or system fault tolerance level 3, a server operating system standard endorsed by Novell, Incorporated. In this network operating system ("NOS"), each "virtual" server is actually two servers running in tandem, continuously mirroring each other's data and processor operation. If one of these physical servers should fail, the other keeps running. This system is expensive, however, requiring identical hardware and a high speed fiber optic link between the physical servers.

The SFT III solution is often both overly expensive and excessive protection given mid-level users' needs. Such users often do not require the instantaneous recovery from a server crash provided by SFT III. To this end, a number of vendors have developed systems in which if the primary server fails, a standby server takes over the primary server's operation after a short, but not instantaneous, period of time. The standby server can use less expensive, albeit slightly slower, hardware than the primary server, reducing overall system cost. Such a system has been introduced by Net-Guard Systems, Incorporated.

All of these systems, however, provide a redundant, unused server. That is, two physical servers are required, but they can only act as a single logical network server, whether through the mirroring of SFT III or the backup server role of the NetGuard system. Network implementers, administrators, and users all wish to maximize their server power. Even in mid-sized networks, great demands are often placed on servers, requiring multiple servers for adequate performance. Each additional physical server incurs cost, however, so any system that reduces cost while providing fault tolerance and greater computing power is greatly desirable.

SUMMARY OF THE INVENTION

According to one aspect of the disclosed embodiment, two active servers each provide backup capability for the other. A first network server is on-line, or active, providing network users with server access through a network operating system; simultaneously, a second network server is also on-line, or active, also providing network users with a second, independent server. Each server is connected to a storage system, such as a disk array, which holds data for network user access. Each server, however, is also connected to the other server's storage system, and can force that other storage system to "switch" from the other server to itself.

The servers each monitor the other for continued operation. Should one server fail, the other server causes the failed server's storage system to switch to the still running server. The still running server then mounts the drives or other media in the newly acquired storage system, informs any running applications of the new drives, and continues running, assuming not only its own responsibilities, but also the responsibilities of the other, failed server.

In this way, the unfettered power of both servers is available during normal operation—each is a separate active server. But when one of the servers fails, the other server then continues to provide access to its own storage system as well as the storage system of the failed server, thus providing all of the stored data to the network users, albeit with reduced performance.

This active backup server technique and system can be further extended to a system in which even more than two active servers provide backup and recovery capability to each other.

In this way, the full processing power of each server is available during normal operation, and yet each server provides an active backup for the other.

BRIEF DESCRIPTION OF THE DRAWINGS

A better understanding of the present invention can be obtained when the following detailed description of the preferred embodiment is considered in conjunction with the following drawings, in which.

2A–2E to determine when one of the servers of FIG. 1 has acquired new drives following a failure of the other server.

DETAILED DESCRIPTION OF THE PREFERRED EMBODIMENT SYSTEM OVERVIEW

Figure 1:
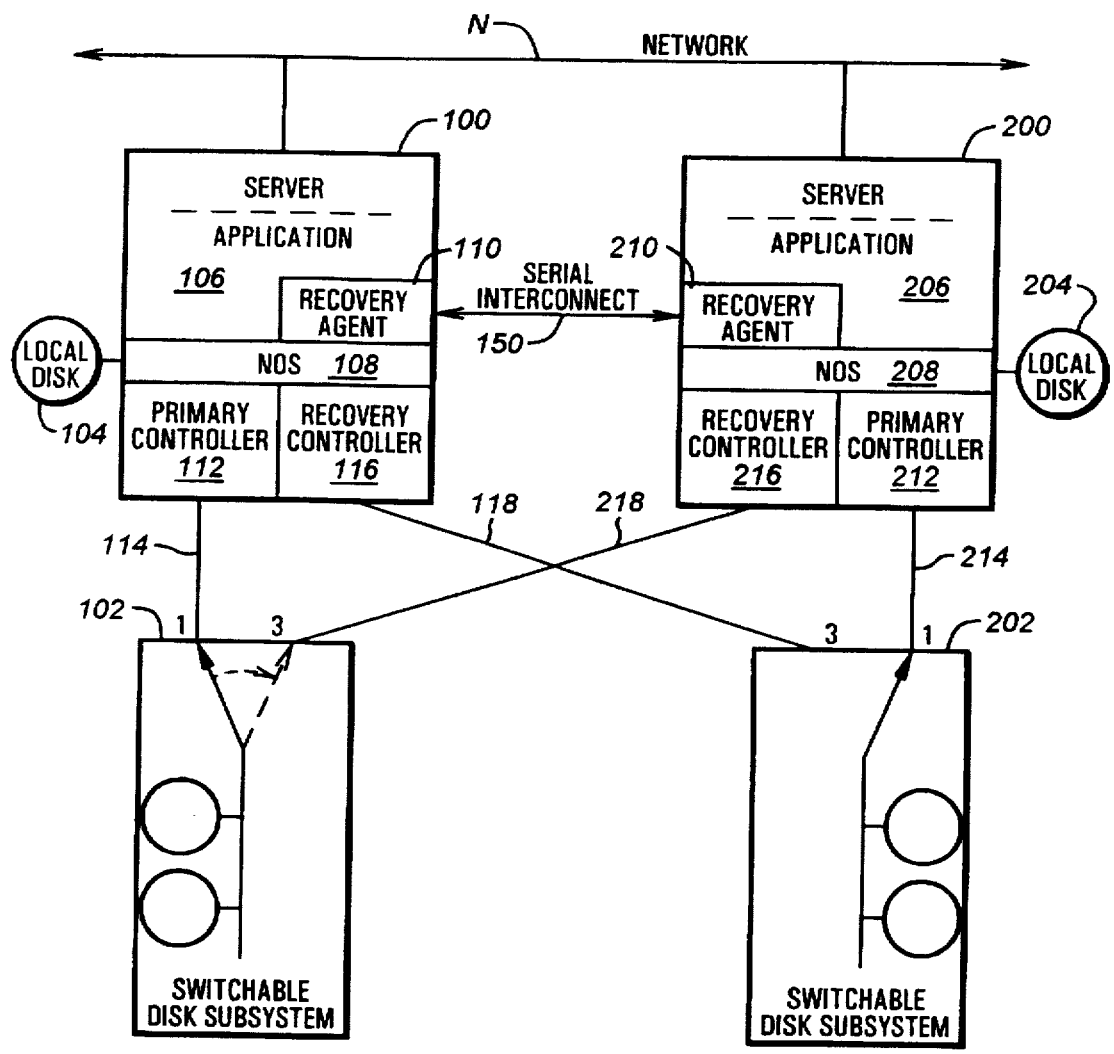
FIG. 1 is a block diagram illustrating the operation of the multiple backup server system according to the invention.

Turning to the drawings, FIG. 1 is a block diagram illustrating the operation of the multiple backup server system according to the invention. A first server 100 and a second server 200 are each connected to a network N as active network servers. During normal operation, both the servers 100 and 200 are active in the sense that they both provide users on the network N with independent server functionality. The first server 100 actively provides network users with access to data on a switchable disk subsystem 102, while the second server 200 actively provides similar access to the data on a switchable disk subsystem 202. Preferably, the switchable disk subsystems 102 and 202 are not the boot disks for the first server 100 and the second server 200. Instead, the first server 100 has a local disk 104 and the second server 200 has a local disk 204. These local disks 104 and 204 preferably include both network operating system (NOS) software and applications software, reserving the switchable disk subsystems 102 and 202 to database storage, document storage, and other data oriented, rather than program oriented, storage.

The first server 100 runs a number of programs and tasks. This includes an application program 106, a NOS 108, and a recovery agent 110, which communicates with a similar recovery agent 210 in the second server 200. The second server 200 similarly runs an application 206, a NOS 208, and the recovery agent 210. The recovery agents 110 and 210 provide the monitoring and failed server recovery capabilities according to the invention. They generally communicate through a serial port (not shown) over a serial interconnect 150. These recovery agents 110 and 210 are further described below in conjunction with FIGS. 2A–2E, but to summarize, they each provide and monitor for a "heartbeat" signal from the other server. Should the recovery agent 110 or 210 in the other server fail to send that heartbeat, the other recovery agent 110 or 210 will cause the NOS 108 or 208 to obtain control of failed server's switchable disk subsystem 102 or 202.

Preferably, the server 100 includes two disk controllers. A primary controller 112 communicates preferably over a SCSI bus 114 to a port on the switchable disk subsystem 102. A recovery controller 116 communicates over a SCSI bus 118 with the second switchable disk subsystem 202 over a port on the switchable disk subsystem 202. The second server 200 similarly includes a primary controller 212 and a recovery controller 216, similarly communicating over a SCSI bus 214 with the second switchable disk subsystem 202 and over a SCSI bus 218 with the first switchable disk subsystem 102. Although two SCSI controllers are shown in each of the servers 100 and 200, these could be implemented as a single controller with switchable SCSI bus connections. But because the switchable disk subsystem 102 and 202 generally include a large number of disks with multiple SCSI addresses, this could restrict the number of disks in the switchable disk subsystem 102 and 202, so preferably two controllers 112 and 116 are used in the first server 100, as well as two controllers 212 and 216 in the second server 200. Similarly, multiple primary controllers and recovery controllers can be implemented in the servers 100 and 200 to switch multiple switchable disk subsystems.

Thus, each of the servers 100 and 200 includes a controller for and connections to each of the switchable disk subsystems 102 and 202. During normal operation, the server 100 controls the disks in the switchable disk subsystem 102 over the SCSI bus 114 via its primary controller 112. The recovery controller 116 is physically connected over the SCSI bus 118 to the second switchable bus subsystem 202, but as seen by the arrows within the second switchable disk subsystem 202, it is physically or logically internally disconnected within that second switchable disk subsystem 202. The same is correspondingly true of the second server 200 and the first switchable disk subsystem 102. The switchable disk subsystems 102 and 202, as well as their corresponding circuitry and control functions used for switching between their first port and a second port, are further described in the parent of this case, of which this case is a continuation-in-part. The parent application, Ser. No. 08/445,283, entitled "MULTI-SERVER FAULT TOLERANCE USING IN-BAND SIGNALLING" and filed May 19, 1995, is hereby incorporated by reference. Another patent that will be of assistance in understanding the disclosed embodiment is U.S. Pat. No. 5,390,324, issued Feb. 14, 1995, and entitled "COMPUTER FAILURE RECOVERY AND ALERT SYSTEM," which is hereby incorporated by reference. This patent describes software that checks for the health of the system, logs errors, and performs server shutdowns when problems are detected.

Based on this configuration, the operation according to the invention will be appreciated. Heartbeat messages are sent back and forth over the serial interconnect 150 by the recovery agent 110 and 210. Should the first server 100 fail, for example, its recovery agent 110 will no longer send a heartbeat message. Therefore, the recovery agent 210 will no longer receive that heartbeat message. According to the invention, the recovery agent 210 then verifies that recovery agent 110 has in fact failed by sending a message over the network N to the recover agent 110. If the recovery agent 110 does not respond, this verifies to the recovery agent 210 that the recovery agent 110 has failed, so the recovery agent 210 sends a series of SCSI resets through its recovery controller 216 and over the SCSI bus 218 to the first switchable disk subsystem 102. According to the invention, the switchable disk subsystem 102, upon receiving that series of resets, internally electrically switches connection of its internal disks from the port connected to the SCSI bus 114 to the port connected to the SCSI bus 218. The recovery controller 216 is thus electrically coupled to the disks within the first switchable disk subsystem 102.

The recovery agent 210 then causes the recovery controller 216 to logically recognize the disks on the switchable disk subsystem 102. Then, the recovery agent 210 causes the NOS 208 to recognize, or "mount"the disks in the switchable disk subsystem 102 and to assign drive letters to these disks for use in subsequent references by other software components. Next, the recovery agent 210 checks the integrity of the disks in switchable disk subsystem 102, such as by running the Windows NT CHKDSK program.

But the application 206 should be informed of the presence of these new drives so that it can provide users on the network N with access to the newly acquired drives. To this end, the recovery agent 210 then provides a message to the application 206 indicating that new drives are available. The application 206 is then able to access those new drives and provide data on those new drives on the switchable disk subsystem 102 to users on the network N. Thus, after a slight delay, the users are again able to access the data they had previously accessed through the first server 100.

Therefore, according to the invention each of the servers 100 and 200 acts as a backup for the other server. (In the following descriptions, the other server 100 or 200 is referred to as the "partner server.") But during normal operation, both of the servers 100 and 200 also actively provide their full processing power to the network N. Should one fail, the other then provides access to the data in both of the switchable disk subsystems 102 and 202 to the network N, albeit with reduced processing power because of the increased load on the remaining server 100 or 200.

The Recovery Agent

Turning to FIGS. 2A–E, a recovery agent service 300 is shown. The recovery agent service 300 performs the functions of the recovery agents 110 and 210 in the first server 100 and the second server 200, and is preferably identical in each. When the NOS 108 or 208 is Windows NT, the recovery agent service 300 is preferably implemented as a Windows NT service that executes a series of "threads." Windows NT is a multi-tasking, multi-threaded operating system, and only a "thread" in a service is actually executed. The recovery agent service 300 would preferably be implemented as a read thread and a write thread that communicate with each other via "events," which are semaphores Windows NT passes among its threads. Rather than show the parallel tracks of the read thread and the write thread, it is more illustrative to show the program flow overall. One skilled in writing software for a multi-threaded system will easily understand how to implement the appropriate threads.

The recovery agent service 300 begins at step 302, where it determines whether a heartbeat message is being received over the serial interconnect 150. These heartbeat messages are comparable to the heartbeat messages used in the single backup system of U.S. Pat. application Ser. No. 08/445,283. If a heartbeat message is not being received from the other server at step 302, control proceeds to step 304, where it is determined whether a predetermined startup timeout is set to zero. If so, according to the disclosed embodiment, control then continuously loops to step 302. This zero value thus causes this server to wait indefinitely for a heartbeat message, and would be set to zero by the system administrator if it was desired to avoid a switch-over due to a timeout on startup. Communication with the partner server over the network N could be attempted at this point, as is discussed below, to see if the partner server is present and operating on the network N. If not, this would indicate the other server has either not been booted, is not present, or has failed.

Implicit in all checks for a heartbeat message being received is a check of the cable fault status, discussed in the incorporated parent patent application. This is further discussed below in conjunction with FIG. 2E, but to summarize, a switch over of the switchable disk subsystem 102 or 202 connected to the partner server (100 or 200) will not occur when there is a cable fault. The rationale is that a system will only have one fault in existence at any point and time. As long as there is a cable fault, the recovery agent service 300 simply waits for that cable fault to be corrected. It is omitted here for clarity.

Control proceeds from step 304 to step 306 if the startup timeout has not been set to zero. It is then determined whether a heartbeat message is being received at step 306, and if not, control then proceeds to step 308.

If at step 308 a time corresponding to the startup timeout has expired, control proceeds to step 310, where it is determined whether a network presence check is enabled. Because the partner server has not responded at step 310, it may be desirable to determine if the other partner is present and operating by sending a message over the network N. The administrator configures the system by setting configuration variables indicating whether a network presence check is to be used, as well as a configuration variable that gives the partner server's network N address. Similarly, the various timeouts are also preferably implemented as administrator modifiable configuration variables. If network presence check is not enabled, control proceeds from step 310 to step 330, where a switch-over of the partner server's switchable disk subsystem 102 or 202 to this server is initiated. If at step 310 the network presence check is enabled, control instead proceeds to step 320, where the recovery agent service 300 will attempt to communicate with the partner server over the network N, as discussed below in conjunction with FIG. 2B.

Returning to step 302 and 306, if a heartbeat message is being received, this indicates the partner server is operating. If so, control proceeds to normal processing at step 340, discussed in conjunction with FIG. 2D.

Figure 2A:
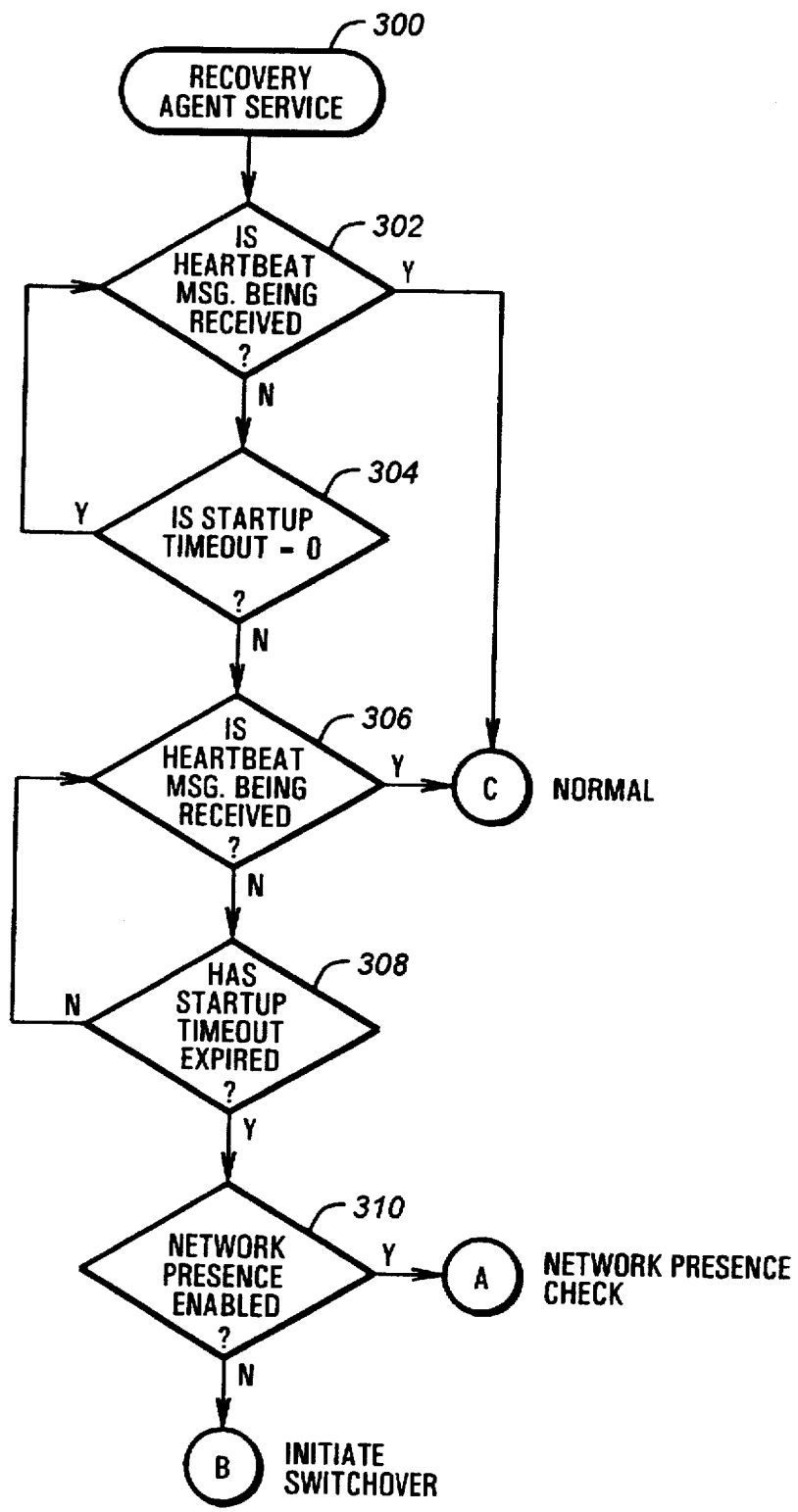
FIGS. 2A–2E are flowchart illustrations of a recovery agent service that executes on both the servers of FIG. 1 according to the invention.
Figure 2B:
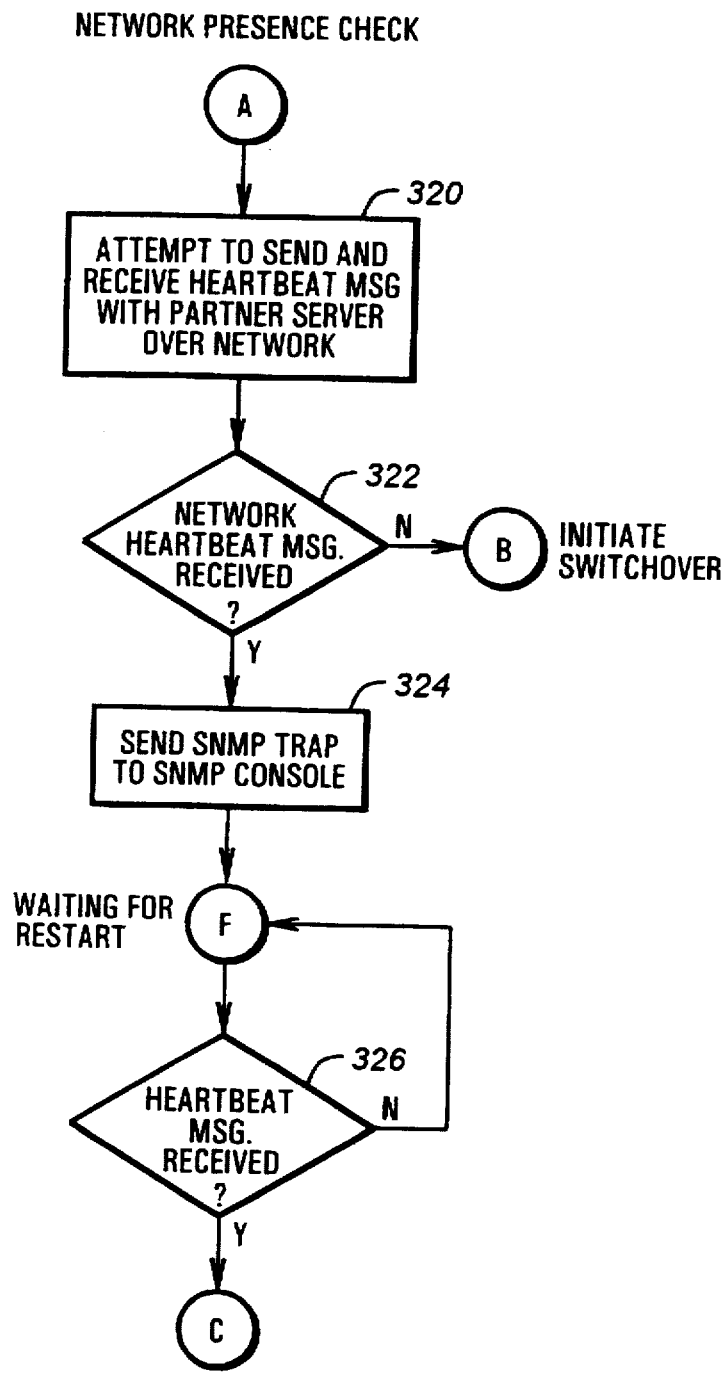

Turning to FIG. 2B, this flowchart illustrates the network presence check of the recovery agent service 300. Step 320 is entered either from step 310 in FIG. 2A or step 348 in FIG. 2D. At step 320, the recovery agent service 300 attempts to send and receive a heartbeat message to and from the partner server over the network N. This is accomplished by sending a heartbeat message to the partner server over the network N and seeing if that heartbeat message is acknowledged by the partner server over the network N. An appropriate pause, such as 10 seconds, allows for network N communications, and will depend on the network N itself. Preferably, messages, whether over the serial interconnect or the network N, are acknowledged by an acknowledgement message. Therefore, when a heartbeat message is sent over the network N the recovery agent service 300 looks for the partner server to acknowledge that message. Similarly, when a heartbeat message is received over the network N, an acknowledgement message is sent to that heartbeat message to the partner server. Implicit in step 320 is a predetermined number of retries. Through a configuration variable, the administrator can set, for example, 10 network N retries before the partner server is determined to have failed.

Figure 2C:
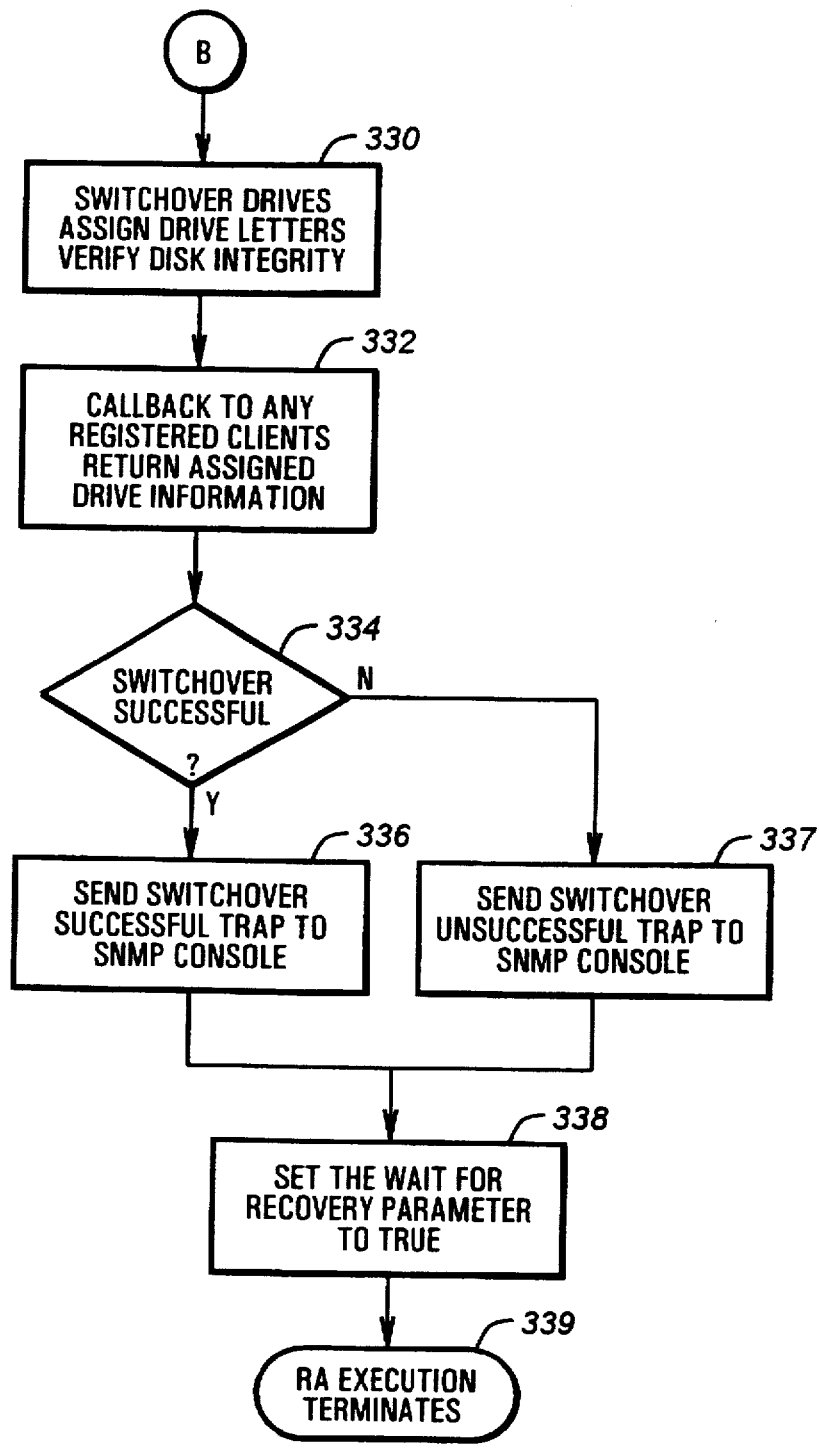

Proceeding to step 322, if a network heartbeat message has not been received from the partner server, control proceeds to step 330 in FIG. 2C, where a switch-over will be initiated, because the partner server is assumed to have failed.

If a heartbeat message was received, control proceeds to step 324, where in the present embodiment, an SNMP trap is sent to an SNMP console, which tracks system operation. SNMP stands for "simple network message protocol" and is a well known standard in the industry. The SNMP console is notified that a heartbeat message is being received, but the serial interconnect 150 appears to have failed. The SNMP console can then inform the administrator or otherwise log the event.

According to the present embodiment, control then proceeds to step 326, where the recovery agent service 5 300 is waiting for a restart through the serial interconnect 150. If the heartbeat message is not being received at step 326 over the serial interconnect 150, control loops back to step 326. Otherwise, control proceeds to step 340, discussed below in conjunction with 10 FIG. 2D, because the serial interconnect 150 is apparently again functioning.

As a further embodiment according to the invention, further processing could be executed at step 326. For example, the server could continue to communicate with the partner server using the network N, rather than serial interconnect 150. If that communication over the network N failed, a switch-over could be initiated at step 330. Further, while the serial interconnect 150 is shown for communication, all communication could instead occur over the network N. This, however, would increase network N traffic, and for this reason, according to the present embodiment, the serial interconnect is preferably used.

Turning to step 330, the portion of the recovery 25 agent service 300 that initiates the switch-over following the partner server's failure is illustrated by a flowchart. Beginning at step 330, drives in the partner server's switchable disk subsystem 102 or 202 are switched over. This is done in a method similar to that 30 described in the parent application, that is, by sending a series of reset signals or other signals to the partner server's switchable disk subsystem 102 or 202. This causes the switchable disk subsystem 102 or 202 to switch to connect to the recovery controller 116 or 216 of this server, so that this server can assume control of that switchable disk subsystem 102 or 202. Once this is done, the drives in the switchable disk subsystem 102 or 202 over which control has been assumed must be assigned letters. This is done through calls to the NOS 108 and 208 and is well known to the art, and simply entails assigning drive numbers to the newly acquired drives. After the drives are acquired, their integrity is preferably verified using a NOS routine, such as the Windows NT CHKDSK software.

At this point, a word about the recovery controllers 116 and 216 is in order. Preferably, any sort of caching in those recovery controllers 116 and 216 should be disabled, as that cached data could be lost if the partner server fails followed by a switch-over. If the registered applications that will access the newly acquired switchable disk subsystem 102 or 202 are robust enough, they can perhaps recover from this loss of data, but preferably, the situation is avoided by disabling any caching within the recovery controller 116 or 216.

Further, many SCSI controllers cause various error messages on startup if they do not have any SCSI devices connected. As is apparent, on startup, the recovery controllers 116 and 216 have no drives logically or electrically attached to them. Therefore, if they include such an error generating feature, this feature should similarly be disabled, whether within the controller firmware itself, within the operating system POST (power on self test) code, or within the NOS itself.

Finally, the recovery controllers 116 and 216 must of course be sophisticated enough to dynamically adopt new SCSI drives.

Once the drives are acquired, applications still do not know about these newly acquired drives. For this reason, control proceeds to step 332, where any applications 106 or 206 that are registered with the recovery agent 110 or 210 application programmer interface (API) implemented in the recovery agent service 300 are informed of the new drives. This is further discussed below in conjunction with FIG. 3. This allows applications 106 or 206 to access those new drives and determine if there is any information that a user may need to access on those drives. This would be especially applicable, for example, in ORACLE or other database programs, where the user has just lost access to those drives, but still desires the information. The application can then appropriately provide access to that database i:.formation. Further, the first server 100 and second server 200 may have been running different applications 106 and 206. To handle this situation, each of the servers 100 and 200 can execute a shell program corresponding to each application 106 or 206 running in the partner server that is not running in this server. This shell program can have the sole purpose of executing an instance of the application 106 or 206 executing in the partner server, but not this server, once that shell program receives the message from the recovery agent server 300 API indicating that the partner server has failed. Then the corresponding application 106 or 206 would be started in this server, and could acquire access to the data on the switchable disk subsystem 102 or 202.

From step 332, control proceeds to step 334, where it is determined whether the switch-over was successful. This is true if the switchable disk subsystem 102 or 202 properly switched over to the server 100 or 200, and drive letters were assigned. If so, control proceeds to step 336, where a successful switch-over SNMP trap is sent as an SNMP message to the SNMP console discussed in conjunction with step 324. The SNMP console can then appropriately log this information or provide an administrator with this information for future diagnostic purposes.

If at step 334, the switch-over was not successful, control instead proceeds to step 337, where a similar trap indicating that the switch-over was not successful is sent to the SNMP console.

From steps 336 and 337, control proceeds to step 338, where a wait for recovery configuration variable is set to true. This indicates that the switchable disk subsystem 102 or 202 have switched over, and until the partner server 100 or 200 is restarted, the present server will continue operating by controlling both the switchable disk subsystem 102 and 202, even if it is shut down and restarted. On start-up, before step 302 at a step not shown, this server will examine that recovery configuration variable. If it is set, this indicates that the partner server has previously failed, but has not been properly restarted, so this server should immediately perform a switch over. This prevents an inordinate wait when this server is shutdown and restarted before the partner server has been repaired. From here, control proceeds to step 339, where the recovery agent service 300 terminates.

Figure 2D:
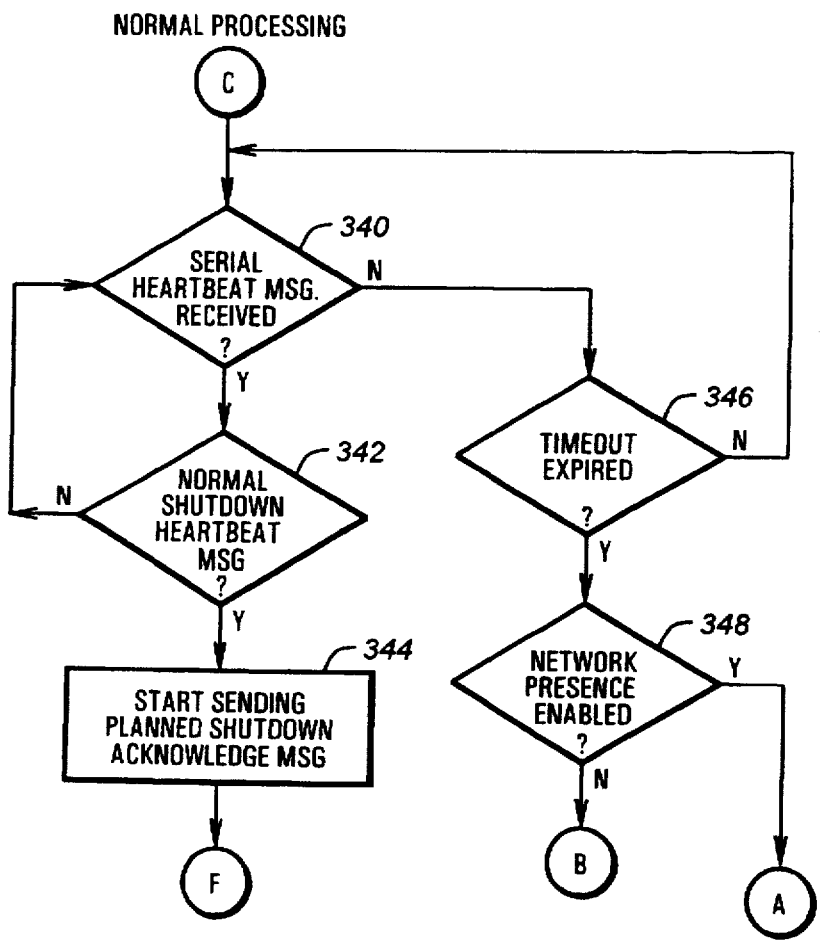

Turning to step 340 in FIG. 2D, a flowchart is shown for the recovery agent service 300 for normal processing. This step is entered from step 306 or 326. In this case, heartbeat messages are being sent and received over the serial interconnect 150. Beginning at step 340, a serial heartbeat message has been received from the partner server, so control proceeds to step 342, where it is determined whether the serial heartbeat message that has been received is not a "ping," or normal heartbeat message, but is instead a normal, or graceful, shutdown heartbeat message. If not, control loops back to step 340. As noted above, whenever a heartbeat message is received, it is preferably acknowledged by sending a message to the partner server indicating that the heartbeat message was properly received. This message is sent over the serial interconnect 150, or over the network N if a network presence check is being performed.

If at step 342 the heartbeat message received was not a "ping," but was instead a normal shutdown heartbeat message, this indicates that the partner server is shutting down normally. In this case, the partner server has not failed, so the switchable disk subsystem 102 or 202 should not be switched over, because it is being turned off. Therefore, control proceeds to step 344, where a planned shutdown heartbeat acknowledgement is sent, and then to step 326 illustrated in FIG. 2B. Control then loops in step 326 until a heartbeat message is again received from the partner server, indicating the partner server and its switchable disk subsystem 102 or 202 has been brought back on line.

If at step 340 a heartbeat message has not been received, control proceeds to step 346, where it is determined whether a timeout has expired. Heartbeat messages are typically required to be sent within a predetermined amount of time, such as 30 seconds, to avoid a switch-over. This predetermined time is typically stored in a configuration variable. If that timeout has not expired at step 346, control proceeds to step 340, where again it is determined whether a heartbeat message has been received.

Of note, as typically implemented using threads, this would be performed by sending the NOS 108 or 208 a message requesting that if a heartbeat message is not received in a certain amount of time over the serial interconnect 150, control should return to the recovery agent service 300. Again, for clarity, this interrupt and thread based implementation has been simplified into normal flowcharts.

From step 346, if the timeout has expired, this indicates that the partner server is no longer sending heartbeat messages over the serial interconnect 150. Therefore, control proceeds to step 348, where it is determined whether network presence is enabled, as discussed above in conjunction with step 310. If network presence is enabled, control proceeds to step 320, where a network presence check is performed. Otherwise, control proceeds to step 330, where a switch-over is initiated.

Figure 2E:
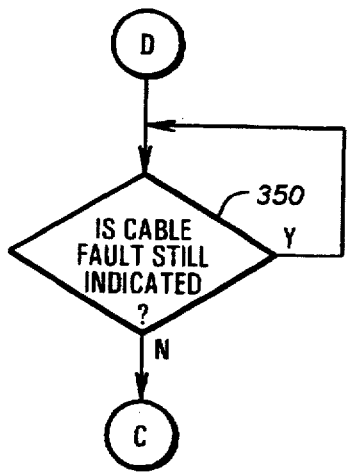

Finally, turning to FIG. 2E, a short routine for determining if a cable fault has occurred in the recovery agent service 300 is shown. At step 350, it is determined whether a cable fault is still indicated.

This step is entered from any step when communications over the serial interconnect 150 is attempted, but a cable fault is indicated as discussed in the incorporated parent application. If a cable fault is indicated, the control loops at step 350. If a cable fault is not indicated, control instead proceeds to the normal processing of step 340.

It will thus be appreciated that if each of the servers 100 and 200 are running the recovery agent service 300 as their recovery agent 110 and 210, both servers 100 and 200 will communicate with each other, continuously sending heartbeat messages. If one should fail to send a heartbeat message, the other will initiate a presence check over the network N. If the partner server does not respond, this indicates the partner server has failed, so the switchable disk subsystem 102 or 202 is switched to allow the remaining server to control both its switchable disk subsystem 102 or 202 through its primary controller 112 or 212, as well as the other switchable disk subsystem 102 or 202 through its recovery controller 116 or 216. In this way, the users still have access to the data on both switchable disk subsystems 102 and 202, even though one of the servers 100 or 200 has failed.

Application Agent

Figure 3:
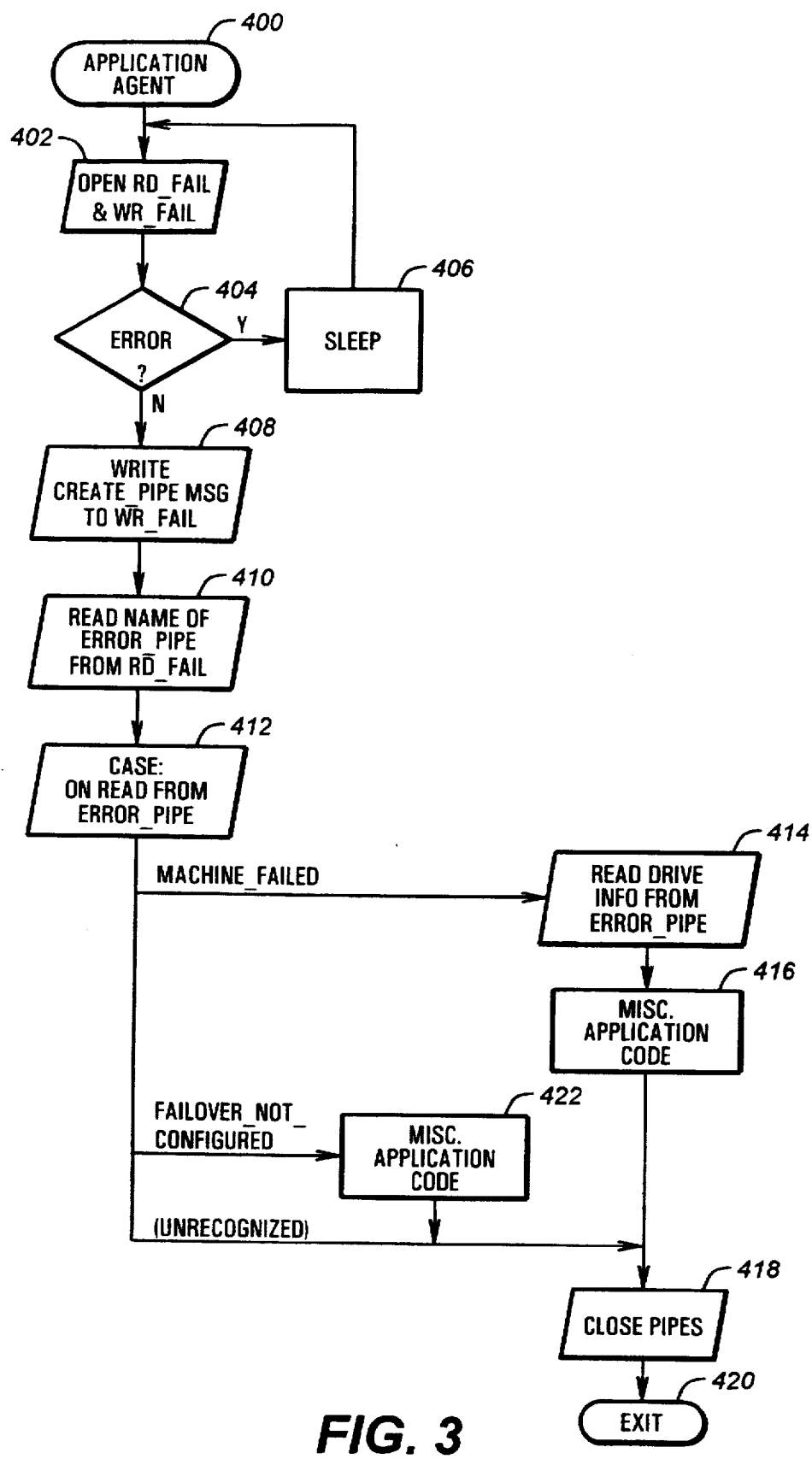
FIG. 3 is a flowchart illustration of an application agent that communicates with the recovery agent service of FIGS.

Turning to FIG. 3, shown is a flowchart illustrating an application agent 400. The application agent 400 is application software that registers with the recovery agent 110 or 210 such that it will be notified of the occurrence of a switch-over and the availability of switched disks. The application agent 400 can then initiate execution of other applications that can access the switchable disk subsystem—such as database programs like Oracle.

Beginning at step 402, the application agent opens two pipes, a RD_FAIL pipe and a WR_FAIL pipe. These pipes are used to communicate with the recovery agent 110 or 210.

Proceeding to step 404, if there was an error opening these pipes, control proceeds to step 406, where the application agent 400 sleeps for a predetermined amount of time and then returns to step 402 to again attempt to open the RD_FAIL pipe and WR_FAIL pipe.

If these pipes were properly opened at step 404, control instead proceeds to step 408, where the application agent 400 writes a CREATE_PIPE message to the WR_FAIL pipe. This causes the recovery agent 110 or 210 to create an error pipe associated with the application agent 400. Preferably, a separate ERROR_PIPE pipe is created for each application that has an application agent 400. As will be understood, of course many applications could have application agents 400, all responding to the recovery agent 110 or 210 when a switch-over occurs.

So proceeding to step 410, the application agent 400 reads the name of that ERROR_PIPE pipe from the RD_FAIL pipe. This ERROR_PIPE pipe provides messages from the recovery agent service 300. When the recovery agent service 300 detects a failure of the partner server and switches the switchable disk subsystem 102 or 202, the recovery agent service 300 at step 332 in Figure 2C sends a message over this pipe to all of the registered applications 106 or 206 that have implemented the application agent 400. This message is sent over the ERROR_PIPE pipe, and applications which have implemented the application agent 400 are considered registered applications as defined in step 332. Proceeding to step 412, the thread in which the application agent 400 is implemented waits for a message over the ERROR_PIPE pipe, which would be sent, as discussed above, in step 332. When it receives a MACHINE_FAILED message, it then proceeds to step 414, where the application agent 400 reads the drive information from the ERROR_PIPE pipe, as provided at step 332 by the recovery agent service 300, and then proceeds to step 416, where it implements miscellaneous application code. This code could include, for example, determining what data is available on the switchable disk subsystem 102 or 202 that has just been acquired by this server, verifying the integrity of that data, and then making that information accessible to the various users on the network N. If the application agent has been implemented in a shell program, similarly, it could, as discussed above, instead open an instance of the appropriate application program, allowing it to provide the functionality previously provided by the application 106 or 206 of the partner server. Control then proceeds to step 418, where all of the pipes are closed, as they are no longer needed, and then the application agent 400 thread terminates at step 420.

If at step 412 a message is received by the application agent 400 that switch-over is not configured, in the form of a FAILOVER_NOT_CONFIGURED message, this indicates that the partner server switch-over is not currently enabled on this particular server. This message would be returned, for example, if this server did support partner servers, but that feature was currently disabled for whatever reason. If this message is received, control proceeds to 422, where miscellaneous application code can be implemented, or possibly a message to the administrator.

Similarly, if an unrecognized message is received from the ERROR_PIPE pipe, as well as from step 422, control proceeds to step 418 where the pipes are closed.

Thus, the application agent 400 will be informed by the recovery agent service 300 when the drives in the switchable disk subsystem 102 or 202 of the partner server have been acquired. It can then perform the appropriate steps to make the data available on the newly acquired drive letters available to users.

Further, the way the application agent 400 is implemented can vary depending on the application. For example, one instance of ORACLE could be running on the non-failed server. On failure of the partner server followed by switchover, an application agent shell program could cause another instance of ORACLE to be initiated. This second instance would then access the newly mounted drives and perform an integrity check of the ORACLE data on those files, making corrections where appropriate. Then, two instances of ORACLE would be running—one directed to the server's initially mounted drives, and the second directed to the newly mounted drives. Such a shell application agent could be further used to start instances of many other programs that the failed partner server was previously running.

ALTERNATIVE EMBODIMENTS

Figure 4:
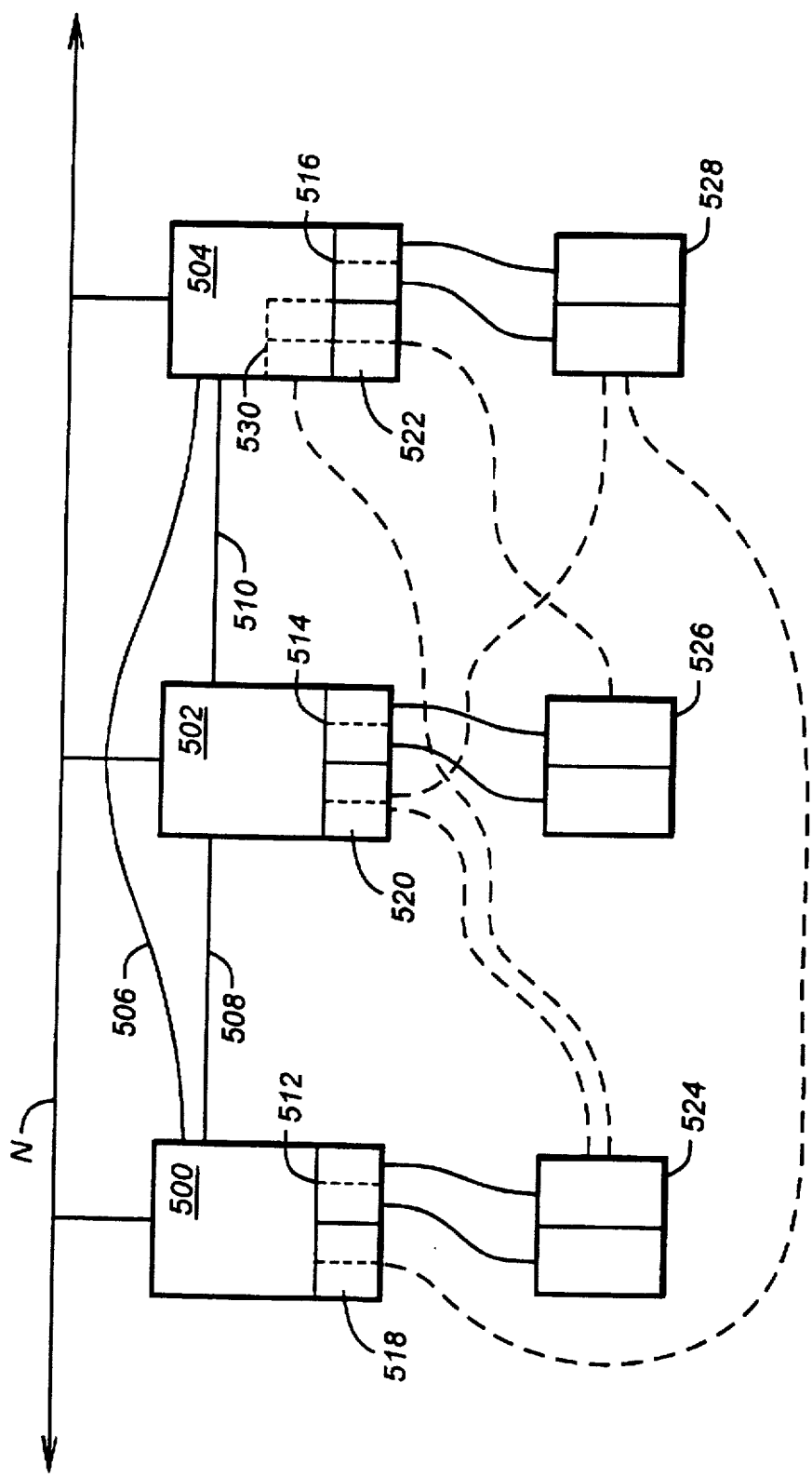
FIG. 4 is a block diagram illustrating alternative embodiments of the server system of FIG. 1.

Turning to FIG. 4, a variety of alternative embodiments are illustrated. In FIG. 4, three servers 500, 502, and 504 are illustrated connected to the network N. Further, each of these servers 500, 502, and 504 are shown interconnected with serial links 506, 508, and 510. As discussed above, these serial links could be replaced with a variety of other type of links, or instead rely solely on heartbeat messages sent exclusively over the network N.

In FIG. 4, each of the servers 500, 502, and 504 are shown with dual primary controllers 512, 514, and 516, as well as dual recovery controllers 518, 520, and 522. Each of the dual primary controllers 512, 514, and 516 is respectively connected to dual storage subsystems 524, 526, and 528. The dual recovery controllers 518, 520, and 522 are shown connected to the dual storage subsystems 524, 526, and 528 in a variety of manners. In the server 500, the dual recovery controller 518 is connected to the two disk arrays in the dual storage system 528. In the server 502, the recovery controller 520 is shown connected to both the dual storage subsystems 524 and 528 corresponding to the servers 500 and 504. This could be implemented, for example, using switchable ports within the dual recovery controller 520 25 itself.

The server 504 is shown with a second recovery controller 530, which is connected to the (dual storage subsystem 524, as well as its recovery con-roller 522, which is connected to the dual storage subsystem 526.

The point of all of this is that multiple servers can be connected in a variety of ways to where they provide backup to the other servers' functionality by assuming control of the other servers' storage system. In the various configurations illustrated in FIG. 4, it is apparent that if one of the servers 500, 502, or 504 should fail, it may be necessary for a priority to be assigned to the remaining servers as to which will assume control of the storage system of the failed server. Alternatively, the storage system 502 could be the backup for the server 500, the server 504 for the server 502, and the server 500 for the server 504 in a daisy chain configuration. It will be appreciated by one of ordinary skill in the art that a wide variety of configurations can be implemented to provide active servers that simultaneously can provide backup for other servers.

It will be appreciated that a system according to the invention is not limited to the various specifics of the embodiment disclosed. For example, the switchable disk subsystem 102 and 202 are shown to be particular disk array systems, but could just as easily be optical disks, tape drives, or any other mass storage media. Similarly, the particulars of how the first server 100 and second server 200 are connected to the switchable disk subsystems 102 and 202 could be greatly varied, including the use of a single SCSI bus connecting all of these components, fiber optic link, or a wide variety of other configurations. Similarly, the various servers are shown to initiate a switchover of another server's storage system via a SCSI bus connection, but a wide variety of other methods could be used, such as via a serial link, or even through a network connection directly to the storage system to be switched. This will all be appreciated by one of ordinary skill in the art.

Further, it will be appreciated that more than two servers can be configured in this manner. A plurality of servers can each have access to the other storage subsystem, with one of them assuming control should another of the servers fail.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. An active server for use with a partner active server coupled to a second storage system in a network, the partner active server providing network data to the second storage system via a partner network operating system, the active server comprising:

a connection for a first storage system, the active server providing network data to said first storage system via a network operating system;

a recovery agent for providing and receiving heartbeat messages to and from the partner active server, said recovery agent sending a switch command upon a failure to receive the heartbeat message from the partner active server; and a connection for the second storage system, the active server providing network data to the second storage system via the network operating system upon receipt by the second storage system of said switch command, wherein the network data provided to said first storage system by said active server is different from the network data provided to said second storage system by said partner active server.

2. The active server of claim 1, further comprising:

registered applications, said recovery agent sending a predetermined message to said registered applications upon a failure of the partner active server to send the heartbeat message.

3. The active server of claim 1, further comprising:

a recovery controller for providing reset signals to the second storage system for coupling the second storage system and the active server wherein the switch command from said recovery agent includes the providing of the reset signals by the recovery controller to the second storage system.

4. The active server of claim 3, further comprising:

a network operating system for providing logical recognition of the second storage system by said recovery controller as part of the switch command from said recovery agent.

5. A system comprising the active server of claim 1, and further comprising the first storage system connected to said connection for the system, wherein the first storage system is switchable from the active server to to the partner active server upon receipt by the first storage system of a switch command from the partner active server indicating a failure to receive a heartbeat message from the active server.

* * * * *